P. A. MAHONEY.
FAUCET.
APPLICATION FILED APR. 3, 1915.
1,161,873.
Patented Nov. 30, 1915.
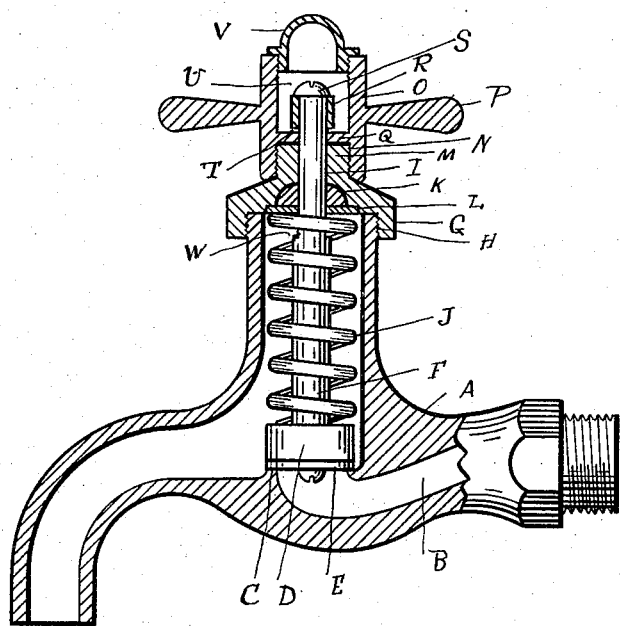
INVENTOR
Patrick A. Mahoney
by Eegmle Verrill
Attorney.

UNITED STATES PATENT OFFICE.

PATRICK A. MAHONEY, OF PORTLAND, MAINE.

FAUCET.

1,161,873.   Specification of Letters Patent.   Patented Nov. 30, 1915.

Application filed April 3, 1915. Serial No. 19,047.

*To all whom it may concern:*

Be it known that I, PATRICK A. MAHONEY, a citizen of the United States, residing at Portland, in the county of Cumberland and State of Maine, have invented certain new and useful Improvements in Faucets, of which the following is a specification.

This invention relates to improvements in faucets adapted to be used where the pressure in the supply is subject to material variations.

Its object is to provide a faucet having the usual means of opening and closing and in addition thereto a construction which permits automatic opening of the valve when the pressure reaches a certain degree.

It also relates to means for preventing interference with the automatically acting relief mechanism.

In the drawing herewith accompanying and making a part of this application the figure is a longitudinal sectional view.

In said drawing A is a valve casing having a water-way B. In said water-way is a valve seat C adapted to be closed by a valve D which may be supplied with a usual packing E. The valve is provided with a vertical stem F. The valve casing is provided with a cap G having screw threaded engagement with the top of the casing as seen at H. Said cap is provided with a valve stem way I. The valve is normally seated by a spring J interposed between the top of the valve and the cap. In the cap G and surrounding the stem is a packing K which may be held in place by a washer L interposed between the cap and the spring. Adapted to have screw threaded engagement with an extension M on the cap as seen at N is a lever for manually operating the valve comprising a tubular body part O, lever arms P and a diaphragm Q provided with a valve stem way. Above the diaphragm a stop or lug R is secured to the stem in any convenient manner, as for example, by a screw S. When the valve is seated there will be a small space T between the bottom of lug R and the diaphragm so that when the valve is seated the valve stem is entirely independent of the lever. Above the diaphragm is a chamber U which is adapted to be closed by a threaded bonnet V which conceals the valve stem and moves with the lever. The valve stem is provided with a shoulder or lug W below the diaphragm positioned so as to prevent the lever from passing off from the threaded extension of the cap.

The operation of my improved device is as follows: The figure shows the valve closed. In the ordinary operation of the faucet, when it is desired to open it, the hand operating lever O is given a sufficient turn to cause the diaphragm to engage the lug, whereupon the further turning of the lever lifts the valve from its seat. Turning the lever O in the opposite direction lowers the lever and relieves the valve which is returned to its seat by the spring. If, while the valve is seated, the pressure in the main reaches a certain degree depending upon the tension of the spring, the valve rises automatically under pressure and gives relief. The closed chamber for the end of the valve stem prevents unwarranted tampering with the automatic relief mechanism.

I claim:

1. In a faucet, a casing having a valve chamber and valve seat, a valve having a valve stem, a cap secured to the top of the valve chamber and provided with a stem way, a spring interposed between said cap and valve tending to hold said valve to its seat, a tubular lever having threaded engagement with said cap and having a diaphragm provided with a valve stem way and a lug on said stem above said diaphragm, the valve stem being free to move upwardly independently of the lever.

2. In a faucet, a casing having a valve chamber and valve seat, a valve having a valve stem, a cap secured to the top of the valve chamber and provided with a stem way, a spring interposed between said cap and valve tending to hold said valve to its seat, a tubular lever having threaded engagement with said cap and having a diaphragm provided with a valve stem way and a lug on said stem above said diaphragm and spaced apart from said diaphragm when the valve is seated, the valve stem being free to move upwardly independently of the lever.

3. In a faucet, a casing having a valve chamber and valve seat, a valve having a valve stem, a cap secured to the top of the valve chamber and provided with a stem way, a spring interposed between said cap and valve tending to hold said valve to its seat, a tubular lever having threaded engagement with said cap and having a diaphragm provided with a valve stem way and a lug on said stem above said diaphragm and a bonnet closing the end of said lever and protecting the end of the valve stem, the valve stem being free to move upwardly independently of the lever.

4. In a faucet, a casing having a valve chamber and valve seat, a valve having a valve stem, a cap secured to the top of the valve chamber and provided with a stem way and having a threaded extension, a spring interposed between said cap and valve tending to hold said valve to its seat, a tubular lever having threaded engagement with said extension of said cap and having a diaphragm provided with a stem way, a lug on said stem below the cap adapted to limit the upward movement of the lever on the cap and a lug on said stem above said diaphragm, the valve stem being free to move upwardly independently of the lever.

In testimony whereof I have affixed my signature hereto.

PATRICK A. MAHONEY.

Copies of this patent may be obtained for five cents each, by addressing the "Commissioner of Patents, Washington, D. C."